3,462,520
PHOSPHATE ESTERS OF ALKOXYLATED
STRAIGHT-CHAIN PRIMARY ALCOHOLS
Louis J. Nehmsmann, Metuchen, and Leslie M. Schenck, Mountainside, N.J., assignors to GAF Corporation, New York, N.Y., a corporation of Delaware
No Drawing. Filed Oct. 14, 1966, Ser. No. 586,627
Int. Cl. C11d 1/34; C07f 9/08
U.S. Cl. 260—950                    7 Claims

ABSTRACT OF THE DISCLOSURE

A surface active phosphate ester composition selected from the class consisting of esters having the following formulae:

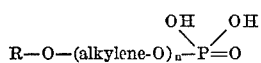

and

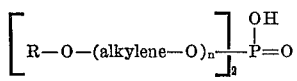

wherein R represents a straight chain alkyl of from 8 to 20 carbon atoms and wherein the alkylenoxy grouping, —(alkylene—O)$_n$, represents a random distribution of oxyethylene and oxypropylene groups in the nonionic molecule R—O(alkylene—O)$_n$ in the ratio of from 5% to 25% by weight of oxypropylene to 75%–95% by weight of oxyethylene and wherein the said oxypropylene and oxyethylene groups comprise about 40% to 75% by weight of said non-ionic molecule. These compositions are biodegradable in addition to having desirable pour point and other properties.

---

This invention relates to a new class of phosphate esters of alkoxylated alcohols having improved physical characteristics and to the process of preparing the same.

Phosphate esters of anionic surfactants such as of ethoxylates of alkylated phenols, ethoxylates of branched chain aliphatic alcohols, and ethoxylates of linear primary alcohols of from 10 to 15 carbon atoms are also well known and methods for their preparation are disclosed in various patents, such as USP 3,004,056, 3,004,057, 3,010,-903, 3,033,889 3,099,676, and 3,235,627. Although the phosphate ester compositions of the type prepared in accordance with the procedure given in these patents display excellent properties as emulsifiers, wetting agents, dispersing agents, detergents, softening agents and the like, they show a wide variation in physical characteristics. The most notable is the difference in pour points of phosphate esters based on ethoxylated alkyl phenols, ethoxylated long-chain primary alcohols containing at least 3 side chains, and ethoxylated linear aliphatic primary alcohols.

The following tabulation shows the pour points of phosphate esters representative of the foregoing type:

| Phosphate ester of— | Pour point in ° F. |
|---|---|
| Nonyl phenol+64% E.O. | <35 |
| Nonyl phenol+54.5% E.O. | <35 |
| Tridecyl alcohol-oxo+56.9% E.O. | <35 |
| C$_{11}$–C$_{15}$ linear primary alcohol+54.5% E.O. | 75 |
| C$_{11}$–C$_{15}$ linear primary alcohol+68% E.O. | 80 |
| C$_{11}$–C$_{15}$ linear primary alcohol+64% E.O. | 75 |
| C$_{14}$ linear primary alcohol+57% E.O. | 75 |
| C$_{14}$ linear primary alcohol+57 Pr. O. | 70 |

From the foregoing data, it is apparent the phosphate esters which constitute the chief articles of commerce, i.e., those derived from nonionics containing from 54–68% ethylene oxide by weight, are liquid at ambient temperatures but tend to solidify at lower temperatures unless they are prepared from nonionics based on alkylphenol and branch chain alcohol hydrophobes. Solidification below ambient, i.e., 70° F., temperatures present a problem not only in storage but also in handling operations during cooler weather when warehousing and storage temperatures are normally maintained in the 50–60° F. range. Unfortunately, the products most commercially acceptable, due to their low pour points contributing to their ease of storage and handling during cold weather, are non-biodegradable, being based on the so-called biologically hard nonionics that use alkylphenol and branch chain alcohols as the hydrophobic portion of the molecule.

Although biodegradable phosphate ester surfactants with satisfactory chemical and use characteristics can be made for replacement of alkylphenol and branched chain alcohol based products by phosphorylation of linear primary alcohol nonionics containing substantially the equivalent weight percentage of ethylene oxide, these phosphate esters are not commercially acceptable due to their physical characteristic of being solids with pour points of approximately 70–80° F. Substitution of ethylene oxide by propylene oxide fails to lower the pour point, and imparts non-biodegradable properties to the ester molecule.

We have found that the foregoing disadvantages are readily overcome by first alkoxylating a straight-chain primary alcohol of from 10 to 20 carbon atoms or a mixture of such alcohols with a controlled admixture of ethylene and propylene oxides, followed by phosphorylation of the mixed alkoxylate with phosphoric anhydride to yield biodegradable surface-active compositions containing mixtures of primary and secondary phosphate esters which have pour points ranging from about 45° F. to about 60° F. The mixture of primary and secondary phosphate esters is not only liquid and pourable at average room temperatures but also biodegradable and when subjected to the U.S. Cotton Soiled Cloth by the Terg-o-tometer test shows a final reflectance of around 30 as compared with 20–25 for the phosphate esters of the prior art.

In obtaining the phosphate esters having the above desirable characteristics, we first polyalkoxylate a primary saturated linear alcohol of from 8 to 20 carbon atoms, or a mixture of such alcohols, with an admixture consisting of 5 to 25% by weight of propylene oxide and from 75 to 95% by weight of ethylene oxide to yield a polyalkoxylate containing not less than 40% by weight and not more than 75% by weight of the mixed ethylene and propylene oxides in the final product. In other words, in the random polyalkoxylation of the alcohol, or mixtures thereof, we employ an admixture of ethylene oxide and propylene oxide in the ratio of 5–25% by weight of propylene oxide to 75–95% by weight of ethylene oxide wherein the polyalkoxy groupings (ethylene oxide and propylene oxide) in the final product consist of not less than 40% to no more than 75% by weight of final product. However, for maximum foam, pour point, cotton detergency, alkali stability, and biodegradability, we prefer that the polyalkoxy groupings in the final product comprise from about 50% to 65% by weight of final product prior to phosphorylation.

Simplifying the foregoing ratios into moles, 1 mole of a primary linear saturated alcohol of from 8 to 20 carbon atoms, or a mixture of such alcohols, is condensed with about 1.5 to 20 moles of an admixture containing from 5 to 25 percent by weight of propylene oxide and from 75 to 95 percent by weight of ethylene oxide in the presence of 0.05 to 0.50 part by weight of caustic soda, based on the weight of the alcohol, as catalyst. The alkoxylation is carried out in a standard steel autoclave in which the alcohol or mixture of alcohols is charged, together with the caustic soda. Following the latter addition, the autoclave is purged with nitrogen, evacuated and then heated to a temperature ranging between 125 to 160° C., followed by the addition of the admixture of propylene and ethylene oxide at a pressure of from 15 to 30 p.s.i.g. and a temperature of from 150 to 160° C. for a period of time ranging from 1 to 12 hours until the alkoxylation is complete. The autoclave is then cooled and its contents discharged. The resulting alkoxylate is then subjected to phosphorylation by the following procedure: Into any suitable reaction vessel equipped with agitator, thermometer and nitrogen inlet, there is added from about 2 to 4.5 moles of the alkoxylate as above obtained and one mole of $P_2O_5$, which is added during a period of about 1 hour, at which time the temperature rises from room to about 100° C. The reaction mixture is maintained at 100–125° for about 5 hours, cooled and discharged. The resulting mixture of primary and secondary esters is a clear liquid with a pour point ranging from <45° F. to about 60° F.

When employing $P_2O_5$ as the phosphorylating agent, a mixture consisting of from 25 to 60% by weight of monoester and from 10 to 65% by weight of diester is obtained having the following formulas:

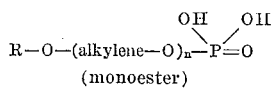
(monoester)

and

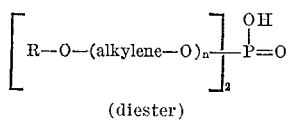
(diester)

wherein R is at least one alkyl of from 8 to 20 carbon atoms, and $-(alkylene-O)_n$ represents a random distribution of oxyethylene and oxypropylene groups in the ratio of from 75%–95% by weight of oxyethylene to 5%–25% by weight of oxypropylene and wherein the said oxyethylene and oxypropylene groups comprise about 40% to about 75% by weight in the non-ionic molecule, $R-O-(alkylene-O)_n$.

The mixture of mono- and di-esters obtained in accordance with the present invention is not only clear but also free of sludge during storage at ambient temperatures and with a pour point of from <45° F. to about 60° F., which represents a pour point depression by about 25 to 40° F. in comparison to the mono- and diesters of the prior art having the same cloud point in distilled water.

The primary monohydric straight chain linear alcohols and mixtures thereof, which are first alkoxylated, include 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol and 1-eicosanol.

Although straight-chain primary alcohols containing from 8 to 20 carbon atoms, or admixtures of such alcohols respond to the foregoing alkoxylation and phosphorylation reaction conditions, when a mixture of alcohols is employed, we prefer an admixture containing from 0 to 10 percent of a $C_{11}$ alcohol, 12 to 24 percent of a $C_{12}$ alcohol, 25 to 35 percent of a $C_{13}$ alcohol, 12 to 24 percent of a $C_{14}$ alcohol and from 0 to 10 percent of alcohols containing less than 11 carbon atoms and more than 15 carbon atoms, and alkoxylated with an admixture of ethylene and propylene oxides containing from 85% to 95% by weight of ethyxlene oxide and from 5% to 15% by weight of propylene oxide.

The following examples are illustrative of the present invention. It is to be understood that all parts and percentages referred to therein are by weight unless otherwise indicated:

EXAMPLE I

There is charged into an autoclave 480 parts by weight of a $C_{12}-C_{15}$ straight chain primary alcohol admixture representing 2.3 moles of alcohol having the following composition: 15% $C_{12}$, 31% $C_{13}$, 31% $C_{14}$, and 23% $C_{15}$ and an average molecular weight of 209. There is then added 0.5 part by weight of caustic soda as catalyst and the autoclave purged with nitrogen, evacuated, then heated to 150° C. Seven hundred and twenty parts by weight of 90/10% by weight mixture of ethylene oxide to propylene oxide (15.9 moles) are added at 15–30 p.s.i. and a temperature of 150–160° C. for 2 hours. Upon cooling, the autoclave was discharged to yield 1206 parts by weight of alkoxylate product. The resulting product has a cloud point of 36° C. (1% solution in distilled water).

There is charged to a one liter four-neck flask equipped with agitator, thermometer, and nitrogen inlet, 515 parts by weight (0.99 mole) of the above alkoxylate. There is then added 52.5 parts by weight (0.37 mole) of $P_2O_5$ at 15° to 115° C. over about one hour. The reaction mixture is heated at 100–115° C. for five hours, cooled, and discharged. The resulting ester is a clear liquid with a pour point of 45° F. In a laboratory tergitometer test using 0.25% concentration in 200 p.p.m. water of a built formulation containing 10% phosphate ester, 35% STPP (sodium tri-poly phosphate), 5.0% $Na_2SiO_3$, 49.0% $Na_2SO_4$, and 1.0% carboxy methyl cellulose (CMC), the final reflectance of a U.S. Testing swatch was 30.0.

Ross-Miles Foam, 0.05% concentration at 25° C., 300 p.p.m. water, initiated at 55 mm.; 50 at 5 minutes.

EXAMPLE Ia

This example shows the difference in physical properties and pour point when the alcohol of Example I is converted to the same cloudpoint nonionic with 100% ethylene oxide, then converted to the phosphate ester.

As a control, 480 parts by weight of the $C_{12-15}$ straight chain primary alcohol admixture of Example I was ethoxylated to a 36° C. cloudpoint in distilled water using 680 parts of ethylene oxide.

A 500 gram aliquot of the above nonionic was converted to the phosphate ester as in Example I using a ratio of 2.67 mole of nonionic per 1 mole of $P_2O_5$.

The resulting ester was a semi-solid at ambient temperature with a pour point of 76° F. In a laboratory tergiotometer test using 0.25% concentration in 200 p.p.m. water of a built formulation containing 1% phosphate ester, 35% sodium tri-poly phosphate (STPP), 5.0% $Na_2SiO_3$, 49.0% $Na_2SO_4$ and 1.0% carboxy methyl cellulose (CMC), the final reflectance of a U.S. Testing swatch was 27.

Ross-Miles Foam, 0.05% concentration at 25° C., 300 p.p.m. water, initiated at 55 mm.; 50 at 5 minutes.

EXAMPLE II

There is charged into an autoclave 420 parts by weight of a $C_{11}-C_{15}$ straight chain primary alcohol representing 2.05 moles of alcohol calculated as a 203 M.W. average and having the following composition: 2% $C_{11}$, 23% $C_{12}$, 32% $C_{13}$, 29% $C_{14}$, 15% $C_{15}$. There is then added 0.5 part by weight of caustic soda as catalyst and the autoclave purged with nitrogen, evacuated, then heated to 150° C. Five hundred and eighty parts by weight of 90/10% by weight mixture of ethylene oxide to propylene oxide (12.9 moles) were added at 15–30 p.s.i. and 150–160° C. Upon cooling, the autoclave was discharged to yield 998 part by weight of product. The resulting nonionic is cloudy at 25° C. (1% solution in distilled water.)

There is charged to a one liter four-neck flask equipped with agitator, thermometer, and nitrogen inlet, 490 parts by weight (1.0 mole) of the above alkoxylate. There is then added 52.5 parts by weight (0.37 mole) of $P_2O_5$ at 15 to 115° C. over about one hour. The reaction mixture is heated at 100–115° C. for five hours, cooled, and discharged. The resulting ester is a clear liquid with a pour point of 45° F. In a laboratory tergitometer test using 0.25% concentration in 200 p.p.m. water of a built formulation containing 10% phosphate ester, 35% STPP, 5.0% $Na_2SiO_3$, 49.0% $Na_2SO_4$ and 1.0% CMC, the final reflectance of a U.S. Testing swatch was 31.0.

Ross-Miles Foam, 0.05% concentration at 25° C., 300 p.p.m. water, initiated at 55 mm.; 50 at 5 minutes.

EXAMPLE III

There is charged into an autoclave 433 parts by weight of a $C_{12}$–$C_{15}$ straight chain primary alcohol representing 2.07 moles of alcohol calculated as a 209 M.W. average and having the following composition: 15% $C_{12}$, 31% $C_{13}$, 31% $C_{14}$, 23% $C_{15}$. There is then added 0.5 part by weight of caustic soda as catalyst and the autoclave purged with nitrogen, evacuated, then heated to 150° C. Seven hundred and sixty-seven parts by weight of 91/9% by weight mixture of ethylene oxide to propylene oxide (16.8 moles) were added at 15–30 p.s.i. and 150–160° C. Upon cooling, the autoclave is discharged to yield 1195 parts by weight by product.

There is charged to a one liter four-neck flask equipped with agitator, thermometer, and nitrogen inlet 575 parts by weight (1.0 mole) of the above alkoxylate. There is then added 52.5 parts by weight (0.37 mole) of $P_2O_5$ at 15 to 115° C. over about one hour. The reaction mixture is heated at 100–115° C. for five hours, cooled, and discharged. The resulting ester is a clear liquid with a pour point of 55° F. In a laboratory tergitometer test using 0.25% concentration in 200 p.p.m. water of a built formulation containing 10% phosphate ester, 35% STPP, 5.0% $Na_2SiO_3$, 49.0% $Na_2SO_4$ and 1.0% CMC, the final reflectance of a U.S. Testing swatch was 30.0.

Ross-Miles Foam, 0.05% concentration at 25° C., 300 p.p.m. water, initiated at 60 mm.; 55 at 5 minutes.

EXAMPLE IV

There is charged into an autoclave 455 parts by weight of a $C_{11}$–$C_{15}$ straight chain primary alcohol representing 2.34 moles of alcohol calculated as a 195 M.W. average and having the following composition: 0.5% $C_{11}$, 20% $C_{12}$, 35% $C_{13}$, 25% $C_{14}$, 14.5% $C_{15}$. There is then added 0.5 part by weight of caustic soda as catalyst and the autoclave purged with nitrogen, evacuated, then heated to 150° C. Seven hundred and forty-five parts by weight of 90/10% by weight mixture of ethylene oxide to propylene oxide (16.4 moles) were added at 15–30 p.s.i. and 150–160° C. Upon cooling, the autoclave is discharged to yield 1195 parts by weight of product.

There is charged to a one liter four-neck flask equipped with agitator, thermometer, and nitrogen inlet 545 parts by weight (1.0 mole) of the above alkoxylate. There is then added 52.5 parts by weight (0.37 mole) of $P_2O_5$ at 15 to 115° C. over about one hour. The reaction mixture is heated at 100–115° C. for five hours, cooled and discharged. The resulting ester is a clear liquid with a pour point of 55° F. In a laboratory tergitometer test using 0.25% concentration in 200 p.p.m. water of a built formulation containing 10% phosphate ester, 35% STPP, 5.0% $Na_2SiO_3$, 49.0% $Na_2SO_4$ and 1.0% CMC, the final reflectance of a U.S. Testing swatch was 31.0.

Ross-Miles Foam, 0.05% concentration at 25° C., 300 p.p.m. water, initiated at 60 mm.; 50 at 5 minutes.

EXAMPLE V

There is charged into an autoclave 390 parts by weight of an octonoic straight chain primary alcohol representing 3.0 moles of alcohol calculated as a 131 M.W. average and having the following composition: 0.5% $C_6$, 98% $C_8$, and 15% $C_{10}$. There is then added 0.5 part by weight of caustic soda as catalyst and the autoclave purged with nitrogen, evacuated, then heated to 150° C. Two hundred and sixty parts by weight of 95/5% by weight mixture of ethylene oxide to propylene oxide (5.7 moles) were added at 15–30 p.s.i. and 150–160° C. Upon cooling, the autoclave is discharged to yield 645 parts by weight of product.

There is charged to a one liter four-neck flask equipped with agitator, thermometer, and nitrogen inlet 215 parts by weight (1.0 mole) of the above alkoxyláte. There is then added 52.5 parts by weight (0.37 mole) of $P_2O_5$ at 15 to 115° C. over about one hour. The reaction mixture is heated at 100–115° C. for five hours, cooled, and discharged. The resulting ester is a clear liquid with a pour point of 47° F.

EXAMPLE VI

There is charged into an autoclave 298 parts by weight of an arachidyl straight chain primary alcohol representing 1.0 mole of alcohol calculated as a 298 M.W. average and having the following composition: 0.5% $C_{18}$, 99% $C_{20}$, 0.5% $C_{22}$. There is then added 0.5% part by weight of caustic soda as catalyst, and the autoclave purged with nitrogen, evacuated, then heated to 150° C. Upon cooling, the autoclave is discharged to yield 1190 parts by weight of product. The resulting nonionic has a cloud point of 70° C. (1% solution in distilled water).

There is charged to a one liter four-neck flask equipped with agitator, thermometer, and nitrogen inlet 478 parts by weight (0.4 mole) of the above alkoxylate. There is then added 21.4 parts by weight (0.15 mole) of $P_2O_5$ at 15 to 115° C. over about one hour. The reaction mixture is heated at 100–115° C. for five hours, cooled, and discharged. The resulting ester is a clear liquid with a pour point of 50° F.

EXAMPLE VII

There is charged into an autoclave 214 parts by weight of a myristryl straight chain primary alcohol representing 1.0 mole of alcohol calculated as a 214 M.W. average and having the following composition: 1.0% $C_{12}$, 98% $C_{14}$, 1.0% $C_{16}$. There is then added 0.5 part by weight of caustic soda as catalyst, and the autoclave purged with nitrogen, evacuated, then heated to 150° C. Three hundred and twenty parts by weight of 90/10% by weight mixture of ethylene oxide to propylene oxide (7.0 moles) were added at 15–30 p.s.i. and 150–160° C. Upon cooling, the autoclave is discharged to yield 530 parts by weight of product. The resulting nonionic has a cloud point of 52° C. (1% solution in distilled water).

There is charged to a one liter four-neck flask equipped with agitator, thermometer, and nitrogen inlet 530 parts by weight (1.0 mole) of the above alkoylate. There is then added 35.5 parts by weight (0.25 mole) of $P_2O_5$ at 15 to 115° C. over about one hour. The reaction mixture is heated at 100–115° C. for five hours, cooled, and discharged. The resulting ester is a clear liquid with a pour point of 55° F. In a laboratory tergitometer test using 0.25% concentration in 200 p.p.m. water of a built formulation containing 10% phosphate ester, 35% STPP, 5.0% $Na_2SiO_3$, 49.0% $Na_2SO_4$ and 1.0% CMC, the final reflectance of a U.S. Testing swatch was 31.

Ross-Miles Foam, 0.05% concentration at 25° C., 300 p.p.m. water, initiated at 55 mm.; 50 to 5 minutes.

We claim:

1. A surface avtice phosphate ester composition selected from the class consisting of esters having the following formulae:

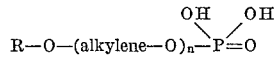

and

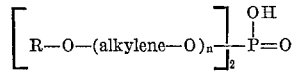

wherein R represents a straight chain alkyl of from 8 to 20 carbon atoms and wherein the alkyleneoxy grouping, —(alkylene—O)$_n$, represents a random distribution of oxyethylene and oxypropylene groups in the non-ionic molecule R—O—(alkylene—O)$_n$ in the ratio of from 5% to 25% by weight of oxypropylene to 75%–95% by weight of oxyethylene and wherein the said oxypropylene and oxyethylene groups comprise about 40% to 75% by weight of said non-ionic molecule.

2. A mixture of surface active phosphate esters selected from the class consisting of esters having the following formulae:

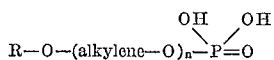

and

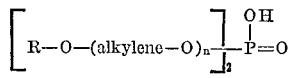

wherein R represents a straight chain alkyl of from 8 to 20 carbon atoms and wherein the alkyleneoxy grouping, —(alkylene—O)$_n$, represents a random distribution of oxyethylene and oxypropylene groups in the non-ionic molecule R—O—(alkylene—O)$_n$ in the ratio of from 5% to 25% by weight of oxypropylene to 75%–95% by weight of oxyethylene and wherein the said oxypropylene and oxyethylene groups comprise about 40% to 75% by weight of said non-ionic molecule.

3. A surface active phosphate ester composition according to claim 1 wherein R is a straight chain alkyl of eight carbon atoms.

4. A surface active phosphate ester composition according to claim 1 wherein R is a straight chain alkyl of twenty carbon atoms.

5. A surface active phosphate ester composition according to claim 1 wherein R is a straight chain alkyl of thirteen carbon atoms.

6. A surface active phosphate ester composition according to claim 1 wherein R represents a mixture of straight chain alkyls containing from 12 to 15 carbon atoms.

7. A surface active phosphate ester composition according to claim 1 wherein R represents a mixture of straight chain alkyls containing from 11 to 15 carbon atoms.

References Cited

UNITED STATES PATENTS 3,277,217 10/1966 Nehmsmann et al. ___ 260—950
3,391,228 7/1968 Nehmsmann et al. ___ 260—950

JOSEPH P. BRUST, Primary Examiner

ANTON H. SUTTO, Assistant Examiner

U.S. Cl. X.R.

252—351, 352; 260—980

PO-1050
(5/69)

G-682

UNITED STATES PATENT OFFICE
CERTIFICATE OF CORRECTION

Patent No. 3,462,520  Dated August 19, 1969

Inventor(s) LOUIS J. NEHMSMANN ET AL

It is certified that error appears in the above-identified patent and that said Letters Patent are hereby corrected as shown below:

Column 4, line 44, "1% phosphate ester" should read -- 10% phosphate ester --. Column 6, line 42, "alkoylate" should read -- alkoxylate --.

SIGNED AND SEALED
NOV 17 1970

(SEAL)
Attest:

Edward M. Fletcher, Jr.
Attesting Officer

WILLIAM E. SCHUYLER, JR.
Commissioner of Patents